United States Patent
Shi et al.

(10) Patent No.: US 11,032,795 B2
(45) Date of Patent: *Jun. 8, 2021

(54) APPARATUS AND METHOD FOR PAGING USER EQUIPMENT AND COMMUNICATIONS SYSTEM

(71) Applicant: FUJITSU LIMITED, Kawasaki (JP)

(72) Inventors: Yulong Shi, Beijing (CN); Haibo Xu, Beijing (CN); Wei Xi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,153

(22) Filed: Jan. 14, 2020

(65) Prior Publication Data
US 2020/0154394 A1 May 14, 2020

Related U.S. Application Data

(63) Continuation of application No. 15/986,208, filed on May 22, 2018, now Pat. No. 10,624,058, which is a
(Continued)

(51) Int. Cl.
*H04W 68/02* (2009.01)
*H04W 68/00* (2009.01)
*H04W 52/02* (2009.01)

(52) U.S. Cl.
CPC ....... *H04W 68/02* (2013.01); *H04W 52/0209* (2013.01); *H04W 68/005* (2013.01); *Y02D 30/70* (2020.08)

(58) Field of Classification Search
CPC . H04W 68/02; H04W 68/00; H04W 52/0216; H04W 4/08; H04W 68/005;
(Continued)

(56) References Cited

U.S. PATENT DOCUMENTS 8,971,270 B2 3/2015 Bachmann et al.
2008/0014937 A1* 1/2008 Laroia ............... H04W 76/11
455/435.1
(Continued)

FOREIGN PATENT DOCUMENTS

CN 103339967 A 10/2013
CN 104025679 A 9/2014
(Continued)

OTHER PUBLICATIONS

International Search Report issued for corresponding International Patent Application No. PCT/CN2015/097866, dated Sep. 9, 2016, with an English translation.
(Continued)

*Primary Examiner* — Daniel Lai
(74) *Attorney, Agent, or Firm* — Myers Wolin, LLC

(57) ABSTRACT

A user equipment (UE) includes: a memory configured to store a plurality of instructions; and a processor coupled to the memory and configured to execute the plurality of instructions to: calculate a first paging group index of the UE by using the following formula: Paging_GroupID=floor (UE_ID/nB); where, Paging_GroupID is the first paging group index, UE_ID based on an identity of the UE, nB is a parameter associate with paging occasions and floor denotes a rounded down operation.

5 Claims, 12 Drawing Sheets

Related U.S. Application Data continuation of application No. PCT/CN2015/097866, filed on Dec. 18, 2015.

(58) Field of Classification Search
CPC ... H04W 68/025; H04W 72/04; H04W 84/18; H04W 8/186; H04W 8/26; H04W 74/085; H04W 76/28; H04W 88/06; H04W 28/18; H04W 36/0055; H04W 68/04; H04W 4/50; H04W 52/0212; H04W 52/0229; H04W 68/10; H04W 68/12; H04W 74/04; H04W 84/027; H04W 84/042; H04W 88/02; H04W 88/04; H04W 88/08; H04W 88/185; H04W 8/22; H04W 8/24; H04W 56/001; H04W 52/0209; Y02D 70/12; Y02D 70/10; Y02D 70/126; Y02D 70/1262; Y02D 70/00

See application file for complete search history.

(56) References Cited

U.S. PATENT DOCUMENTS

| | | | |
|---|---|---|---|
| 2008/0070598 | A1 | 3/2008 | Willey |
| 2008/0182596 | A1 | 7/2008 | Wang et al. |
| 2010/0002720 | A1 | 1/2010 | Ji et al. |
| 2010/0272004 | A1 | 10/2010 | Maeda et al. |
| 2011/0159905 | A1* | 6/2011 | Zheng .............. H04W 72/005 455/509 |
| 2011/0194428 | A1* | 8/2011 | Wang ............... H04W 72/005 370/252 |
| 2011/0312347 | A1 | 12/2011 | Dinan |
| 2013/0015953 | A1 | 1/2013 | Hsu et al. |
| 2013/0114484 | A1 | 5/2013 | Suzuki et al. |
| 2013/0136072 | A1* | 5/2013 | Bachmann ........... H04W 68/00 370/329 |
| 2015/0341898 | A1 | 11/2015 | Xu |
| 2016/0044642 | A1 | 2/2016 | Xu et al. |
| 2016/0112948 | A1 | 4/2016 | Liang et al. |
| 2016/0234804 | A1* | 8/2016 | Hu .................... H04W 68/005 |

FOREIGN PATENT DOCUMENTS

| | | |
|---|---|---|
| CN | 104105111 A | 10/2014 |
| JP | 2013-524563 A | 6/2013 |
| WO | 2011/100497 A1 | 8/2011 |

OTHER PUBLICATIONS

Non-Final Office Action issued by the United States Patent and Trademark Office for corresponding U.S. Appl. No. 15/986,208, electronically dated Jan. 11, 2019.

Final Office Action issued by the United States Patent and Trademark Office for corresponding U.S. Appl. No. 15/986,208, electronically dated Jul. 11, 2019.

Notice of Preliminary Rejection issued by the Korean Intellectual Property Office for corresponding Korean Patent Application No. 10-2018-7016259, dated Feb. 12, 2019, with an English translation.

Notification of Reasons for Refusal by the Japan Patent Office issued for corresponding Japanese Patent Application No. 2018-529994, dated Aug. 6, 2019 with a full English translation.

Notice of Final Rejection issued for corresponding Korean Patent Application No. 10-2018-7016259, dated Aug. 19, 2019 with full English translation attached.

The extended European search report with supplementary European search report, Annex to the European Search Report and European search opinion issued for corresponding European Patent Application No. 15910573.3, dated Aug. 21, 2019.

3GPP TR 45.820 V13.0.0 (Aug. 2015):"3rd Generation Partnership Project; Technical Specification Group GSM/EDGE Radio Access Network; Cellular system support for ultra-low complexity and low throughput Internet of Things (CIoT); (Release 13)", Valbonne, France, Aug. 2015, (Cited on EESR for European Patent Application No. 15910573.3, dated Aug. 21, 2019).

Nokia Networks, "N-GSM: Design and Performance for N-PCH," 3GPP TSG GERAN Ad Hoc#3 on FC_IoT_LC, Tdoc GPC150509, Agenda items 1.4.2.2, 2.4.1.2, Kista, Sweden, Jun. 29-Jul. 2, 2015, (Cited on EESR for European Patent Application No. 15910573.3, dated Aug. 21, 2019).

Second Notice of Final Rejection issued for corresponding Korean Patent Application No. 10-2018-7016259, dated Oct. 22, 2019 with full English translation attached.

Notice of Allowance issued by the United States Patent and Trademark Office for corresponding U.S. Appl. No. 15/986,208, electronically delivered on Dec. 13, 2019.

Examination Report issued by the Patent Office of India on Jul. 15, 2020 for counterpart Indian patent application No. 201837019248.

Communication pursuant to Article 94(3) EPC issued by the European Patent Office for corresponding European Patent Application No. 15910573.3, dated Jul. 10, 2020.

* cited by examiner

APPARATUS AND METHOD FOR PAGING USER EQUIPMENT AND COMMUNICATIONS SYSTEM

CROSS REFERENCE TO RELATED APPLICATIONS

This application is a continuation of U.S. application Ser. No. 15/986,208 filed May 22, 2018, which is a continuation application of International Application PCT/CN2015/097866 filed on Dec. 18, 2015, the entire contents of each are incorporated herein by reference.

TECHNICAL FIELD

This disclosure relates to the field of communications technologies, and in particular to an apparatus and method for paging a user equipment and a communications system.

BACKGROUND

Internet of Things (IoT) is more and more widely used in the next generation of mobile communications networks. A traffic of IoT has many new features, including extra low power consumption requirement, deployment of massive user equipment (UE), relatively less flow of data, and low requirement on traffic latency, etc. Such features pose many technical requirements to an LTE (long term evolution) system, in which an important requirement includes that behaviors of UE should be power saving as possible.

A new wireless communications technology for supporting IoT traffics, i.e. a subject of a technology of narrow band Internet of Things (NB-IoT), is under study in the 3rd generation partnership project (3GPP). The NB-IoT technology is a new narrow band communications technology based on the existing LTE technology and enhanced to satisfy IoT traffic demands.

A scheme for paging a UE, especially a scheme for paging a UE in an idle state, existing in an NB-IoT and an LTE system, requires power saving as much as possible. In an existing paging scheme, within each paging cycle and at a subframe in a specified system frame number (SFN), the UE monitors a paging message transmitted by the network. The system frame where the UE monitors the paging is referred to as a paging frame (PF), and the subframe in the PF monitoring the paging is referred to as a paging occasion (PO).

For example, a formula used by each UE for calculating its PF and PO is as follows: SFN mod T=(T div N)*(UE_ID mod N), i_s=floor(UE_ID/N) mod Ns; where, SFN and i_s respectively determine positions of the PF and the PO, and parameters N, T, Ns, and nB, etc., are configured by the network, such as N: min(T, nB), Ns: max(1, nB/T), UE_ID=IMSI mod 1024. An international mobile subscriber identity (IMSI) is a numeral value fixed in the UE, and nB is a parameter broadcasted by the network in system information, and denotes a total number of POs of a cell within a paging cycle.

When a UE has arrived data, a mobility management entity (MME) transmits a paging message to a base station (such as an eNB), and the base station transmits a paging message within a PO of the UE. The paging message is carried by, for example, a physical downlink shared channel (PDSCH) indicated by downlink control information (DCI) in a physical downlink control channel (PDCCH). After the UE decodes the paging message on the PDSCH, if a UE identity in the paging message is identical to that of itself, it shows that the UE is paged, and a connection establishment request should be initiated.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that according to existing PF and PO allocation rules, it is possible that multiple UEs have identical PFs and POs. when a UE corresponding to a PO is paged, other UEs within the PO will also decode PDCCHs and PDSCHs. However, the other UEs are unable to find UE identities of themselves in paging messages of the PDSCHs, which shows that these UEs are not paged, and actually, these UEs waste power in decoding the PDSCHs.

Such a phenomenon of power consumption may be referred to as "false paging". The higher the number of UEs in a cell is, the severer phenomena of "false paging" is, and the more power consumption of the UEs is. Hence, the problem of "false paging" is urgently to be solved for an IoT network having massive UEs.

Embodiments of this disclosure provide an apparatus and method for paging a UE and a communications system, in which paged UEs are grouped so that different groups have identical or approximate numbers of UEs as possible, thereby reducing a probability of "false paging" of the overall cell.

According to a first aspect of the embodiments of this disclosure, there is provided a method for paging a UE, including:

calculating a first-grade paging group index of the UE based on an inherent identity of the UE, or based on an inherent identity of the UE and a network configuration parameter;

calculating a second-grade paging group index of the UE based on a network identity allocated by a mobility management entity for the UE;

receiving indication information for indicating paging group indices transmitted by a base station, the paging group indices including a first-grade paging group index and a second-grade paging group index;

determining whether the first-grade paging group index contained in the indication information is consistent with the calculated first-grade paging group index, and whether the second-grade paging group index contained in the indication information is consistent with the calculated second-grade paging group index; and decoding a downlink data channel transmitted by the base station to determine whether the UE is paged, when the first-grade paging group index contained in the indication information is consistent with the calculated first-grade paging group index and the second-grade paging group index contained in the indication information is consistent with the calculated second-grade paging group index.

According to a second aspect of the embodiments of this disclosure, there is provided an apparatus for paging a UE, configured in the UE, the apparatus including:

a first calculating unit configured to calculate a first-grade paging group index of the UE based on an inherent identity of the UE, or based on an inherent identity of the UE and a network configuration parameter;

a second calculating unit configured to calculate a second-grade paging group index of the UE based on a network identity allocated by a mobility management entity for the UE;

an information receiving unit configured to receive indication information for indicating paging group indices transmitted by a base station, the paging group indices including a first-grade paging group index and a second-grade paging group index;

an information determining unit configured to determine whether the first-grade paging group index contained in the indication information is consistent with the first-grade paging group index calculated by the first calculating unit, and whether the second-grade paging group index contained in the indication information is consistent with the second-grade paging group index calculated by the second calculating unit; and an information decoding unit configured to decode a downlink data channel transmitted by the base station to determine whether the UE is paged, when the first-grade paging group index contained in the indication information is consistent with the first-grade paging group index calculated by the first calculating unit and the second-grade paging group index contained in the indication information is consistent with the second-grade paging group index calculated by the second calculating unit.

According to a third aspect of the embodiments of this disclosure, there is provided a method for paging a UE, including:

transmitting indication information for indicating paging group indices, the paging group indices including a first-grade paging group index and a second-grade paging group index;

wherein, the first-grade paging group index is obtained based on inherent identity of the UE, or based on the inherent identity of the UE and a network configuration parameter, and the second-grade paging group index is obtained based on network identity allocated by a mobility management entity for the UE.

According to a fourth aspect of the embodiments of this disclosure, there is provided an apparatus for paging a UE, configured in a base station, the apparatus including:

an information transmitting unit configured to transmit indication information for indicating paging group indices, the paging group indices including a first-grade paging group index and a second-grade paging group index;

wherein, the first-grade paging group index is obtained based on inherent identity of the UE, or based on the inherent identity of the UE and a network configuration parameter, and the second-grade paging group index is obtained based on network identity allocated by a mobility management entity for the UE.

According to a fifth aspect of the embodiments of this disclosure, there is provided a method for paging a UE, including:

allocating a network identity for the UE attached to a mobility management entity;

wherein, the network identity makes multiple UEs belonging to a same first-grade paging group uniformly distributed in different second-grade paging groups, the first-grade paging group being formed based on inherent identities of the UEs, or based on the inherent identities of the UEs and network configuration parameters.

According to a sixth aspect of the embodiments of this disclosure, there is provided an apparatus for paging a UE, configured in a mobility management entity, the apparatus including:

an identity allocating unit configured to allocate a network identity for the UE attached to the mobility management entity;

wherein, the network identity makes multiple UEs belonging to a same first-grade paging group uniformly distributed in different second-grade paging groups, the first-grade paging group being formed based on inherent identities of the UEs, or based on the inherent identities of the UEs and network configuration parameters.

According to a seventh aspect of the embodiments of this disclosure, there is provided a communications system, including:

a UE configured with the apparatus for paging a UE as described in the second aspect;

a base station configured with the apparatus for paging a UE as described in the fourth aspect; and a mobility management entity configured with the apparatus for paging a UE as described in the sixth aspect.

An advantage of the embodiments of this disclosure exists in that a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
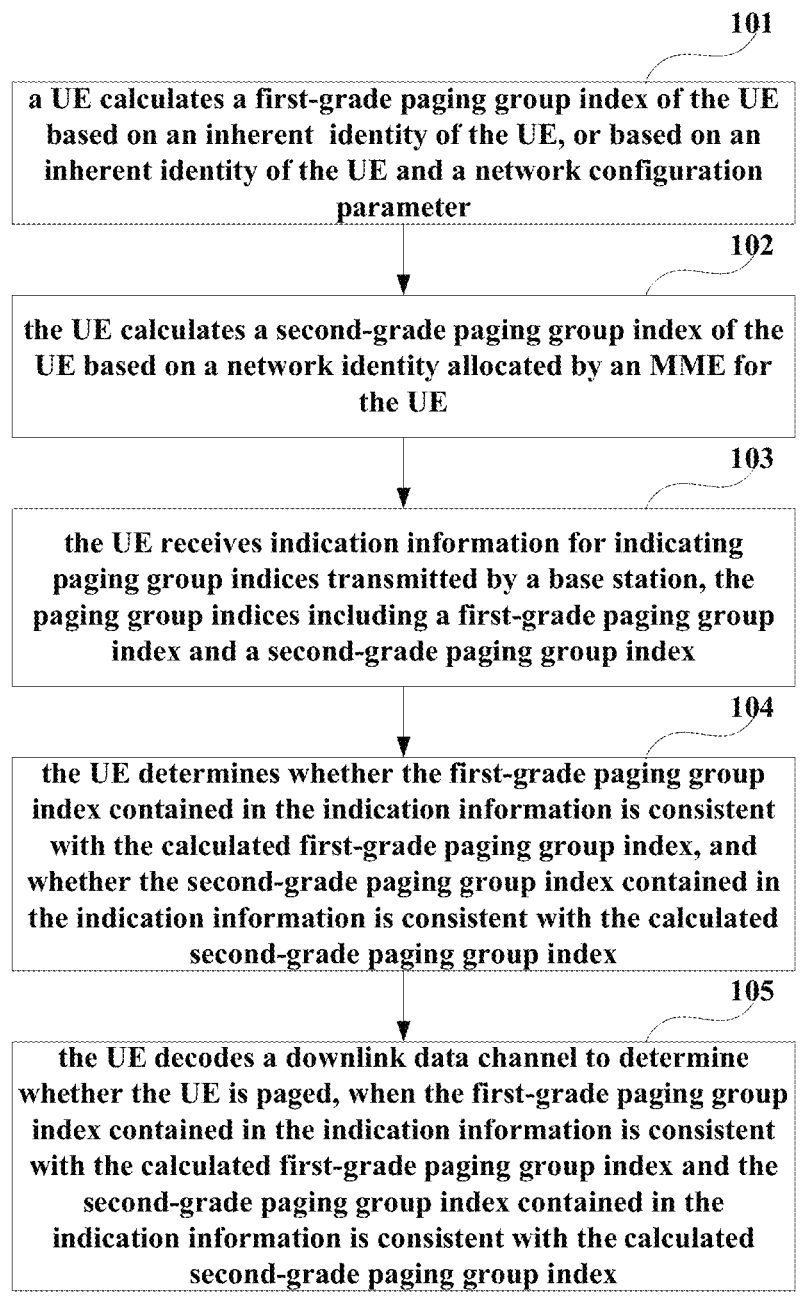
FIG. 1 is a schematic diagram of the method for paging a UE of Embodiment 1 of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

For the "false paging", a method for expanding a paging cycle of UE may be taken into account for use, so as to save power of the UE as possible. However, not all latency requirements of IoT traffics permit the use of an expanded paging cycle. For such traffics, a method for grouping UEs may be adopted, in which a paging group to which the UE paged at each time belongs is indicated in DCI of a PDCCH at this time. For UEs within a PO, only the UE in an indicated paging group decodes the PDSCH, and this will greatly lower a probability of "false paging".

There are many methods for grouping UEs in a cell, and a method that is generally used is determining a number of a paging group to which it belongs according to an IMSI of the UE; the number of paging groups in the network may be determined by the network. However, in such a general method of paging group, as IMSI are arbitrarily allocated and fixed in the UE, the number of UEs really exist in each paging group in a PO may be uneven.

In a special case, the numbers of UEs in a PO are extremely unevenly distributed in paging groups, which causes the number of UEs in a group of the PO to be much more than the numbers of UEs in other groups. The paging group having a relatively large number of UEs still has a very high probability of "false paging" in the PO. When the numbers of UEs in different paging groups in the same PO are identical, the PO has a relatively small probability of "false paging"; while the above general method of paging group is unable to ensure this point, and as a result, it is possible that a PO still has a relatively high probability of "false paging", and power consumption of part of UEs is outstandingly increased.

Therefore, in this disclosure, a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell.

The embodiment of this disclosure shall be described below in detail by taking NB-IoT and LTE as examples. However, this disclosure is not limited thereto, and it is also applicable to other communications systems. Communications systems having relatively a large number of UEs and needing for paging a UE are all applicable to this disclosure.

Embodiment 1

The embodiment of this disclosure provides a method for paging a UE. FIG. 1 is a schematic diagram of the method for paging a UE of the embodiment of this disclosure, which shall be described from a UE side. As shown in FIG. 1, the method includes:

Block 101: a UE calculates a first-grade paging group index of the UE based on an inherent identity of the UE, or based on an inherent identity of the UE and a network configuration parameter.

Block 102: the UE calculates a second-grade paging group index of the UE based on a network identity allocated by a mobility management entity for the UE.

Block 103: the UE receives indication information for indicating paging group indices transmitted by a base station, the paging group indices including a first-grade paging group index and a second-grade paging group index.

Block 104: the UE determines whether the first-grade paging group index contained in the indication information is consistent with the calculated first-grade paging group index, and whether the second-grade paging group index contained in the indication information is consistent with the calculated second-grade paging group index.

Block 105: the UE decodes a downlink data channel transmitted by the base station to determine whether the UE is paged, when the first-grade paging group index contained in the indication information is consistent with the calculated first-grade paging group index and the second-grade paging group index contained in the indication information is consistent with the calculated second-grade paging group index.

In this embodiment, the UE may be, for example, a terminal of an NB-IoT. However, this disclosure is not limited thereto; for example, the UE may also be a terminal of another network system. The embodiments of this disclosure shall be described by taking an NB-IoT as an example only. However, this disclosure is not limited thereto, and it is also applicable to any system where UE paging is performed.

Furthermore, a base station in the embodiments of this disclosure may be a macro base station (such as an eNB), and the UE may be served by a macro cell generated by the macro base station. And a base station in the embodiments of this disclosure may also be a pico base station, and the UE may be served by a pico cell generated by the pico base station. However, this disclosure is not limited thereto, and a particular scenario may be determined according to an actual situation.

In this embodiment, the inherent identity of the UE may be an IMSI, the network identity of the UE may be an SAE (system architecture evolved)-temporary mobile subscriber identity (S-TMSI), and the network configuration parameter may be a number nB of paging occasions of a cell in a paging cycle.

Following description shall be given by taking IMSI, S-TMSI and nB as examples only. However, this disclosure is not limited thereto, and other identities or parameters may also be used; for example, S-TMSI may be replaced with a global unique temporary user equipment identity (GUTI). And furthermore, such identities or parameters may be obtained by the UE via system information (SI), and reference may be made to the relevant art for how to obtain IMSI, S-TMSI, and nB, etc.

In this embodiment, the first-grade paging group index may be calculated by using the following formula:

$$UE\_ID = IMSI \bmod 1024;$$

$$Paging\_GroupID = UE\_ID \text{ div } nB, \text{ or}$$
$$Paging\_GroupID = \text{floor}(UE\_ID/nB);$$

where, Paging_GroupID is the first-grade paging group index, IMSI is the international mobile subscriber identity, nB is the network configuration parameter, mod denotes a modulo operation, div denotes a division operation, and floor denotes a rounded down operation.

Furthermore, the second-grade paging group index may be calculated by using the following formula:

$$S\text{-}TMSI\_GroupID = S\text{-}TMSI \bmod 2^M;$$

where, S-TMSI_GroupID is the second-grade paging group index, S-TMSI is the temporary mobile subscriber identity, M is a predefined number of bits used in S-TMSI grouping, and mod denotes a modulo operation.

In this embodiment, in considering formulae for calculating a PF and a PO in the relevant art, the inventors found the following rules:

within a whole paging cycle, there exist total nB POs, there existing 1024/nB different UE_IDs in each PO; and possible UE_ID values in each PO may be differed from each other by nB, that is, UE_IDs that possibly appear in a PO include {i, i+nB, i+2*nB, i+3*nB, 1+4*nB, . . . }, i=0, 1, 2, . . . nB−1.

And at the same time, it was noted that although the IMSI of the UE is not allocated by the network, the S-TMSI of the UE is allocated by the MME of the network in an attachment procedure. Hence, it may be deemed that all UEs have specific S-TMSIs in the MME allocated by the network. And in allocating the S-TMSIs of the UEs by the MME, some features may be added, so as to ensure that the numbers of the UEs allocated in the same paging group are identical or approximate.

In this embodiment, the indication information may be contained in DCI of a PDCCH, and the UE may obtain the indication information by monitoring the DCI of the PDCCH; or the indication information may be contained in system information, and the UE may obtain the indication information by receiving the system information transmitted by the base station. Following description shall be given by taking a PDCCH and a PDSCH as examples. However, this disclosure is not limited thereto; for example, the PDCCH may be replaced by an ePDCCH, or an M-PDCCH, etc.

Figure 2:
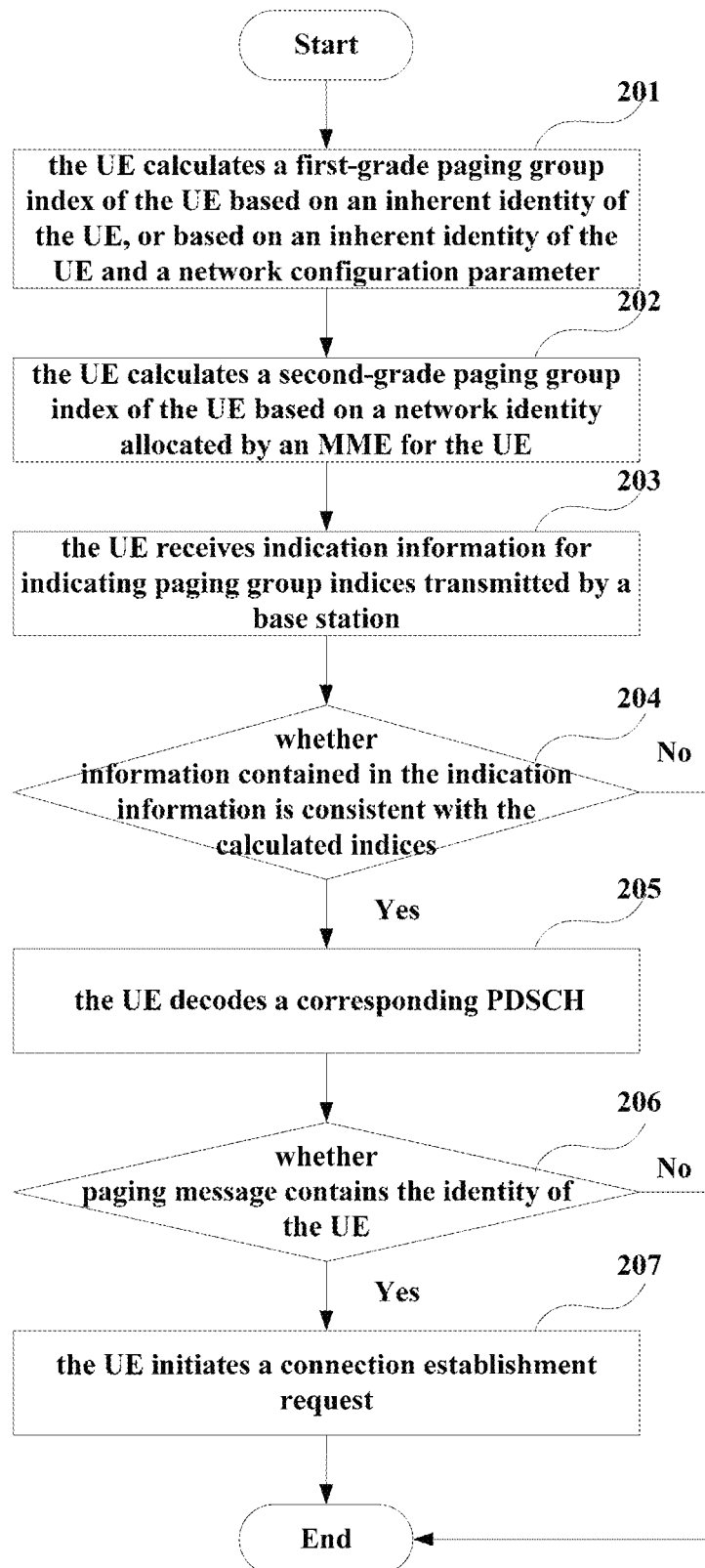
FIG. 2 is another schematic diagram of the method for paging a UE of Embodiment 1 of this disclosure.

FIG. 2 is another schematic diagram of the method for paging a UE of the embodiment of this disclosure. As shown in FIG. 2, the method includes:

Block 201: the UE calculates a first-grade paging group index of the UE based on an inherent identity of the UE, or based on an inherent identity of the UE and a network configuration parameter;

in this implementation, the first-grade paging group index may be calculated based on an IMSI only; for example, UE_ID=IMSI mod 1024 is taken as the first-grade paging group index;

and the first-grade paging group index may also be calculated based on an IMSI and nB; for example, Paging_GroupID=UE_ID div nB=(IMSI mod 1024) div nB is taken as the first-grade paging group index, a range of value of Paging_GroupID being {0, 1, 2, 3, . . . , 1024/nB−1}.

Block 202: the UE calculates a second-grade paging group index of the UE based on a network identity allocated by an MME for the UE;

in this implementation, S-TMSI_GroupID=S-TMSI mod $2^M$ may be taken as the second-grade paging group index; reference may be made to Embodiment 3 below for allocation of the S-TMSI.

Block 203: the UE receives indication information for indicating paging group indices transmitted by a base station, the paging group indices including a first-grade paging group index and a second-grade paging group index;

in this implementation, following two fields may be added into the DCI of the PDCCH indicating the paging message to respectively indicate the index of the first-grade paging group to which the paged UE belongs and the index of the second-grade paging group to which the paged UE belongs, a paging group index of the UE being jointly determined by the two grades of paging group indices:

a Paging_GroupID field, which denotes the index of the first-grade paging group to which the paged UE belongs, calculation of the group index being related to, for example, the IMSI of the UE and the parameter nB configured by the network; the number of bits of the field may be fixed, or may be variable, but at least $\log_2(1024/nB)$ bits should be included; and an S-TMSI_GroupID field, which denotes the index of the second-grade paging group to which the paged UE belongs, calculation of the group index being related to, for example, the S-TMSI (or GUTI) of the UE; the number of bits of the field is M.

Furthermore, the base station may transmit cycle information to the UE, the cycle information being used to indicate that the UE needs not to monitor paging at the PO of its own within multiple paging cycles after a paging message is received; for example, following field may further be included in the DCI of the PDCCH:

a PO_Skip_Number field, which denotes that traffic arrival will not occur within consecutive PO_Skip_Number paging cycles after the paged UE receives the paging message, and the UE needs not to monitor the PDCCH at the PO.

In this embodiment, the first-grade paging group index and the second-grade paging group index contained in the indication information may be obtained by the base station through calculation, or may be obtained by the MME through calculation, and details may be as described in the following embodiments 2 and 3.

Block 204: the UE determines whether the information contained in the indication information is consistent with the calculated indices, that is, whether the first-grade paging group index contained in the indication information is consistent with the first-grade paging group index calculated in block 201, and whether the second-grade paging group index contained in the indication information is consistent with the second-grade paging group index calculated in block 202. the UE executes block 205 when they are respectively consistent, and the UE does not decode corresponding PDSCHs when they are not respectively consistent.

In this implementation, the UE may monitor the field Paging_GroupID and the field S-TMSI_GroupID in the DCI of the PDCCH, and if two grades of paging group indices indicated by the two fields are both identical to the indices calculated by the UE (i.e. the indices calculated in block 201 and block 202), it shows that a paging message of the UE may exist in the PDSCH, and the UE should decode the PDSCH to further check whether there exists the UE identity of itself in the paging message; otherwise, if at least one grade of paging group index in the fields Paging_GroupID and S-TMSI_GroupID is different from the index calculated by the UE itself, the UE does not decode the PDSCH.

Block 205: the UE decodes a corresponding PDSCH.

Block 206: the UE determines whether the decoded paging message contains the identity of the UE; the UE executes 207 if it is determined yes, and it is determined that the UE is not paged if it is determined no; and Block 207: the UE initiates a connection establishment request.

If the UE successfully receives the paging message and the field PO_Skip_Number is read from the DCI indication, the UE may not monitor the PDCCH of the PO of itself in the next PO_Skip_Number paging cycles.

It should be noted that FIGS. 1 and 2 only schematically describe the embodiment of this disclosure; however, this disclosure is not limited thereto. For example, an order of execution of the blocks or steps may be appropriately adjusted, and furthermore, some other blocks or steps may be added, or some of these blocks or steps may be reduced.

It can be seen from the above embodiment that a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell. And furthermore, as the group number parameters of the paging allocation are determined by the parameter nB known to the UE, air-interface signaling needed by separately configuring the parameters may be reduced.

Embodiment 2

The embodiment of this disclosure provides a method for paging a UE, which is further description on the basis of Embodiment 1, with contents identical to those in Embodiment 1 being not going to be described herein any further.

Figures 3, 4:
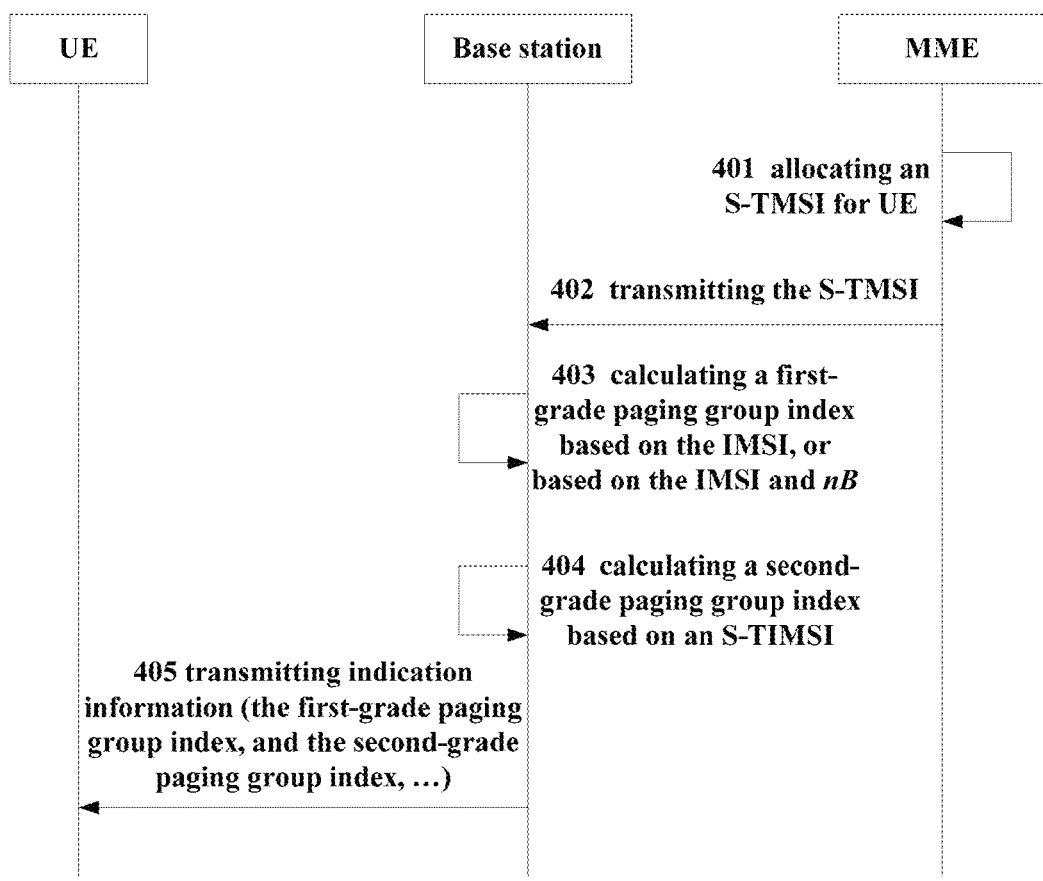
FIG. 3 is a schematic diagram of the method for paging a UE of Embodiment 2 of this disclosure.
FIG. 4 is another schematic diagram of the method for paging a UE of Embodiment 2 of this disclosure.

FIG. 3 is a schematic diagram of the method for paging a UE of the embodiment of this disclosure, which shall be described from a base station side. As shown in FIG. 3, the method includes:

Block 301: a base station transmits to a UE indication information for indicating paging group indices, the paging group indices including a first-grade paging group index and a second-grade paging group index;

the first-grade paging group index is obtained based on inherent identity of a UE, or based on the inherent identity of the UE and a network configuration parameter, and the second-grade paging group index is obtained based on network identity allocated by a mobility management entity for the UE.

In this embodiment, the inherent identity of the UE may be an IMSI, the network identity of the UE may be an S-TMSI, and the network configuration parameter may be a number nB denoting the number of POs of a cell in a paging cycle; however, this disclosure is not limited thereto. And furthermore, the indication information may be transmitted via DCI of a PDCCH, or may be transmitted via system information.

In this embodiment, the base station may further transmit cycle information to the UE, the cycle information being used to indicate that the UE needs not to monitor within multiple paging cycles after a paging message is received. The cycle information may be contained in the indication information; for example, a field PO_Skip_Number may be added into the DCI of the PDCCH.

In an implementation, the first-grade paging group index and the second-grade paging group index may be obtained by the base station through calculation, and the first-grade paging group index and the second-grade paging group index may be contained in, for example, the DCI of the PDCCH.

FIG. 4 is another schematic diagram of the method for paging a UE of the embodiment of this disclosure, which is further description from a UE side, a base station side and an MME side. As shown in FIG. 4, the method includes:

401: an MME allocates an S-TMSI for a UE;

reference may be made to Embodiment 3 for how to allocate the S-TMSI by the MME.

402: the MME transmits the S-TMSI to a base station;

for example, the S-TMSI may be transmitted to the base station in a network attachment procedure; however, this disclosure is not limited thereto, and any related method may be used.

403: the base station calculates a first-grade paging group index of the UE based on the IMSI of the UE, or based on the IMSI and the nB;

in this implementation, the first-grade paging group index may be calculated based on the IMSI only, or the first-grade paging group index may be calculated based on the IMSI and the nB;

for example, Paging_GroupID=UE_ID div nB=(IMSI mod 1024) div nB is taken as the first-grade paging group index, a range of value of Paging_GroupID being {0, 1, 2, 3, . . . , 1024/nB−1}.

404: the base station calculates a second-grade paging group index of the UE based on an S-TIMSI;

in this implementation, S-TMSI_GroupID=S-TMSI mod $2^M$ may be taken as the second-grade paging group index.

405: the base station transmits to the UE indication information for indicating paging group indices, the paging group indices including the first-grade paging group index and the second-grade paging group index.

In another implementation, the first-grade paging group index and the second-grade paging group index may be calculated and then transmitted to the base station by the MME, and the base station contains the first-grade paging group index and the second-grade paging group index in, for example, the DCI of the PDCCH.

Figure 5:
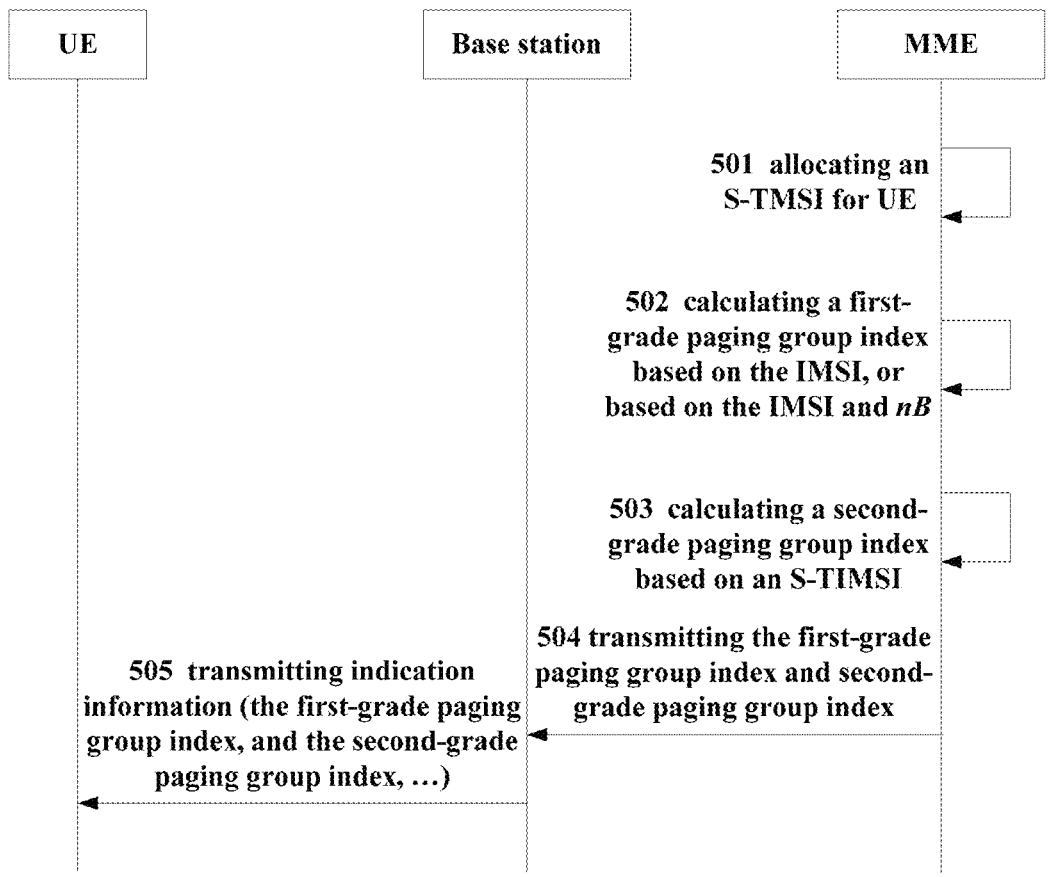
FIG. 5 is a further schematic diagram of the method for paging a UE of Embodiment 2 of this disclosure.

FIG. 5 is a further schematic diagram of the method for paging a UE of the embodiment of this disclosure, which is further description from the UE side, the base station side and the MME side. As shown in FIG. 5, the method includes:

501: the MME allocates an S-TMSI for a UE;

reference may be made to Embodiment 3 for how to allocate the S-TMSI by the MME.

502: the MME calculates a first-grade paging group index of the UE based on the IMSI of the UE, or based on the IMSI and the nB;

in this implementation, the first-grade paging group index may be calculated based on the IMSI only, or the first-grade paging group index may be calculated based on the IMSI and the nB; for example, Paging_GroupID=UE_ID div nB=(IMSI mod 1024) div nB is taken as the first-grade paging group index, a range of value of Paging_GroupID being $\{0, 1, 2, 3, \ldots, 1024/nB-1\}$.

503: the MME calculates a second-grade paging group index of the UE based on an S-TIMSI;

in this implementation, S-TMSI_GroupID=S-TMSI mod $2^M$ may be taken as the second-grade paging group index.

504: the MME transmits the first-grade paging group index and the second-grade paging group index to the base station.

505: the base station transmits to the UE indication information for indicating paging group indices, the paging group indices including the first-grade paging group index and the second-grade paging group index.

It should be noted that FIGS. 4 and 5 only schematically describe the embodiment of this disclosure; however, this disclosure is not limited thereto. For example, an order of execution of blocks or steps may be appropriately adjusted, and furthermore, some other blocks or steps may be added, or some of these blocks or steps may be reduced.

It can be seen from the above embodiment that a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell. And furthermore, as the group number parameters of the paging allocation are determined by the parameter nB known to the UE, air-interface signaling needed by separately configuring the parameters may be reduced.

Embodiment 3

The embodiment of this disclosure provides a method for paging a UE, which is further description on the basis of embodiments 1 and 2, with contents identical to those in embodiments 1 and 2 being not going to be described herein any further.

Figure 6:
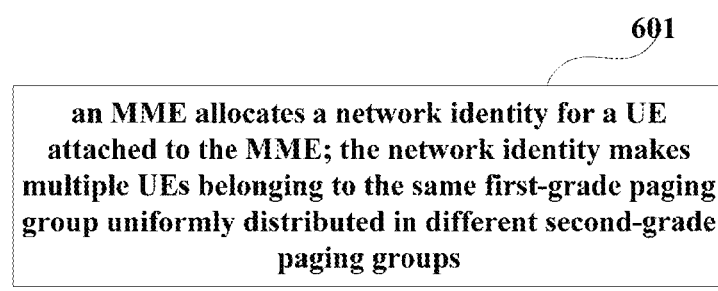
FIG. 6 is a schematic diagram of the method for paging a UE of Embodiment 3 of this disclosure.

FIG. 6 is a schematic diagram of the method for paging a UE of the embodiment of this disclosure, which shall be described from an MME side. As shown in FIG. 6, the method includes:

Block 601: the MME allocates a network identity for a UE attached to the MME;

the network identity makes multiple UEs belonging to the same first-grade paging group uniformly distributed in different second-grade paging groups, the first-grade paging group being formed based on inherent identities of the UEs, or based on the inherent identities of the UEs and network configuration parameters.

In this embodiment, the inherent identity of the UE may be an IMSI, the network identity of the UE may be an S-TMSI, and the network configuration parameter may be a number nB denoting the number of paging occasions of a cell in a paging cycle; however, this disclosure is not limited thereto.

In this embodiment, in order to ensure that the numbers of the UEs in different paging groups are identical or approximate, in allocating the S-TMSI by the MME for the UE, it should be ensured that UEs attached to the MME and belonging to the same first-grade paging group are evenly distributed in different second-grade paging groups.

In this embodiment, in allocating the S-TMSI, the MME may control lowest M bits of the S-TMSI. And the MME stores $2^L$ variables S-TMSI_GroupID[i]; where, $1=0, 1, 2, 3, \ldots 2^L-1$, L is a preset value, initial values of these variable being all 0.

Figure 7:
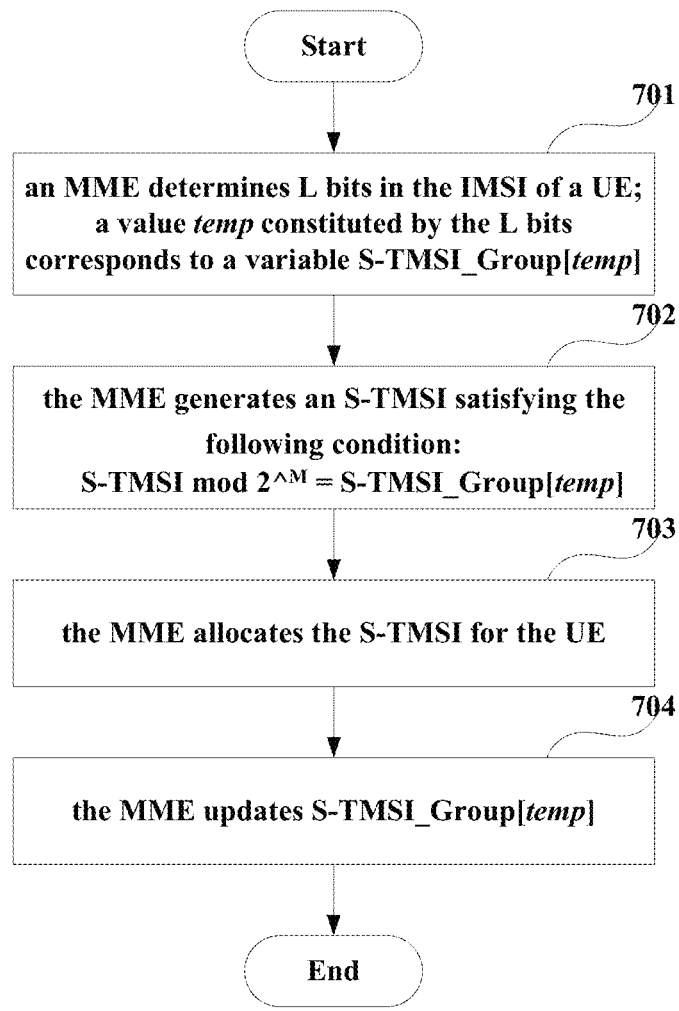
FIG. 7 is a schematic diagram of the method for allocating S-TMSIs of Embodiment 3 of this disclosure.

FIG. 7 is a schematic diagram of the method for allocating S-TMSIs of the embodiment of this disclosure. As shown in FIG. 7, in each time of allocating an S-TMSI for a UE, the MME executes the following steps:

Block 701: the MME determines L bits in the IMSI of the UE; a numeral value constituted by the L bits is temp, the temp corresponding to a variable S-TMSI_Group[temp].

Block 702: the MME generates an S-TMSI satisfying the following condition:

S-TMSI mod $2^M$=S-TMSI_Group[temp]; where, M is a predefined number of bits used in S-TMSI grouping, and mod denotes a modulo operation; the MME may continuously and randomly generate S-TMSIs in turn, until the S-TMSI satisfying the above condition is obtained.

Block 703: the MME allocates the S-TMSI for the UE; and

Block 704: the MME updates S-TMSI_Group[temp].

For example, S-TMSI_Group[temp]=S-TMSI_Group[temp]+1. And if a value of S-TMSI_Group[temp] after being updated is equal to $2^M$, S-TMSI_Group[temp] may be reset to be 0.

In this embodiment, when specific L bits in the IMSI are selected, the L bits may be selected continuously, or may be selected uncontinuously, from all bits in the IMSI, and positions of the L bits may be provided in a protocol.

In one implementation, when the first-grade paging group is formed based on inherent identities of the multiple UEs and the network configuration parameters, the lowest 10 bits in the IMSI may be selected.

UE_ID=IMSI mod $2^L$;

Paging_GroupID=UE_ID div nB, or,
Paging_GroupID=floor(UE_ID/nB);

where, Paging_GroupID is the first-grade paging group index, IMSI is the international mobile subscriber identity, nB is the network configuration parameter, mod denotes a modulo operation, div denotes a division operation, and floor denotes a rounded down operation.

In another implementation, when the first-grade paging group is formed based on the inherent identities of the multiple UEs, the lowest 10 bits and bits from a ($\log_2 P+1$)-th bit to a ($\log_2(G*P)$)-th bit in an ascending order in the IMSI may be selected;

Paging_GroupID=(IMSI mod $G*P$)/$P$;

and G and P are predefined values, P≥1024, Paging_GroupID is the first-grade paging group index, IMSI is the international mobile subscriber identity, and mod denotes a modulo operation.

For example, if G=4 and P=2048, Paging_GroupID=(IMSI mod 4*2048)/2048, and the lowest 10 bits and bits from a 12th bit to a 13th bit in an ascending order in the IMSI should be selected, that is, total 12 bits (L=12) are selected from the IMSI.

Hence, in allocating the S-TMSIs by the MME, some features may be added, so as to ensure that the numbers of the UEs allocated in the same paging group are identical or approximate.

In one implementation, the MME may transmit the S-TMSI to the base station, and the first-grade paging group index and the second-grade paging group index may be calculated by the base station, and may be contained by the base station in, for example, the DCI of the PDCCH.

In another implementation, the first-grade paging group index and the second-grade paging group index may be calculated by the MME and then transmitted to the base station, and the base station may contain the first-grade paging group index and the second-grade paging group index in, for example, the DCI of the PDCCH. And reference may be made to embodiments 1 and 2 for how to calculate the first-grade paging group index and the second-grade paging group index.

It can be seen from the above embodiment that the MME may control the lowest M bits of the network identity in allocating network identity, and a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell. And furthermore, as the group number parameters of the paging allocation are determined by the parameter nB known to the UE, air-interface signaling needed by separately configuring the parameters may be reduced.

Embodiment 4

The embodiment of this disclosure provides an apparatus for paging a UE, configured in the UE. This embodiment corresponds to Embodiment 1, with contents identical those in Embodiment 1 being not going to be described herein any further.

Figure 8:
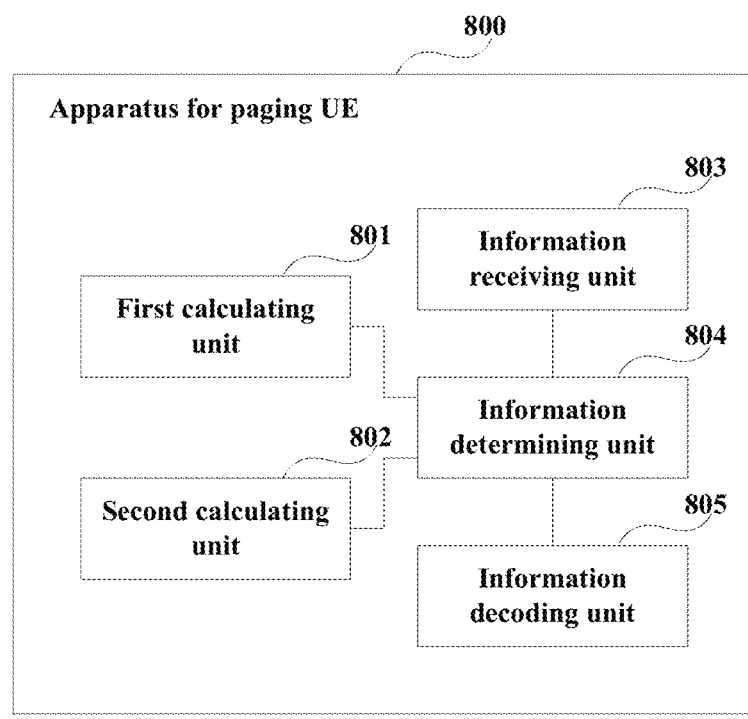
FIG. 8 is a schematic diagram of the apparatus for paging a UE of Embodiment 4 of this disclosure.

FIG. 8 is a schematic diagram of the apparatus for paging a UE of the embodiment of this disclosure. As shown in FIG. 8, the apparatus 800 for paging a UE includes:

a first calculating unit 801 configured to calculate a first-grade paging group index of the UE based on an inherent identity of the UE, or based on an inherent identity of the UE and a network configuration parameter;

a second calculating unit 802 configured to calculate a second-grade paging group index of the UE based on a network identity allocated by a mobility management entity for the UE;

an information receiving unit 803 configured to receive indication information for indicating paging group indices transmitted by a base station, the paging group indices including a first-grade paging group index and a second-grade paging group index;

an information determining unit 804 configured to determine whether the first-grade paging group index contained in the indication information is consistent with the first-grade paging group index calculated by the first calculating unit 801, and whether the second-grade paging group index contained in the indication information is consistent with the second-grade paging group index calculated by the second calculating unit 802; and an information decoding unit 805 configured to decode a downlink data channel transmitted by the base station to determine whether the UE is paged, when the first-grade paging group index contained in the indication information is consistent with the first-grade paging group index calculated by the first calculating unit 801 and the second-grade paging group index contained in the indication information is consistent with the second-grade paging group index calculated by the second calculating unit 802.

In this embodiment, the inherent identity of the UE may be an IMSI, the network identity may be an S-TMSI, and the network configuration parameter may be a number nB denoting paging occasions of a cell in a paging cycle.

In this embodiment, the first calculating unit 801 may calculate the first-grade paging group index by using the following formula:

UE_ID=IMSI mod 1024;

Paging_GroupID=UE_ID div $nB$, or
Paging_GroupID=floor(UE_ID/$nB$);

where, Paging_GroupID is the first-grade paging group index, IMSI is the international mobile subscriber identity, nB is the network configuration parameter, mod denotes a modulo operation, div denotes a division operation, and floor denotes a rounded down operation.

In this embodiment, the second calculating unit 802 may calculate the second-grade paging group index by using the following formula:

S-TMSI_GroupID=S-TMSI mod $2^{-M}$;

where, S-TMSI_GroupID is the second-grade paging group index, S-TMSI is the temporary mobile subscriber identity, M is a predefined number of bits used in S-TMSI grouping, and mod denotes a modulo operation.

In this embodiment, the information receiving unit 803 may obtain the indication information by monitoring downlink control information of a physical downlink control channel, or may obtain the indication information by receiving system information transmitted by the base station. And the downlink data channel may be a physical downlink shared channel.

In this embodiment, the information receiving unit 803 may further be configured to receive cycle information transmitted by the base station, the cycle information indicating that no monitoring is needed within multiple paging cycles after a paging message is received.

This embodiment further provides a UE, configured with the apparatus 800 for paging a UE as described above.

Figure 9:
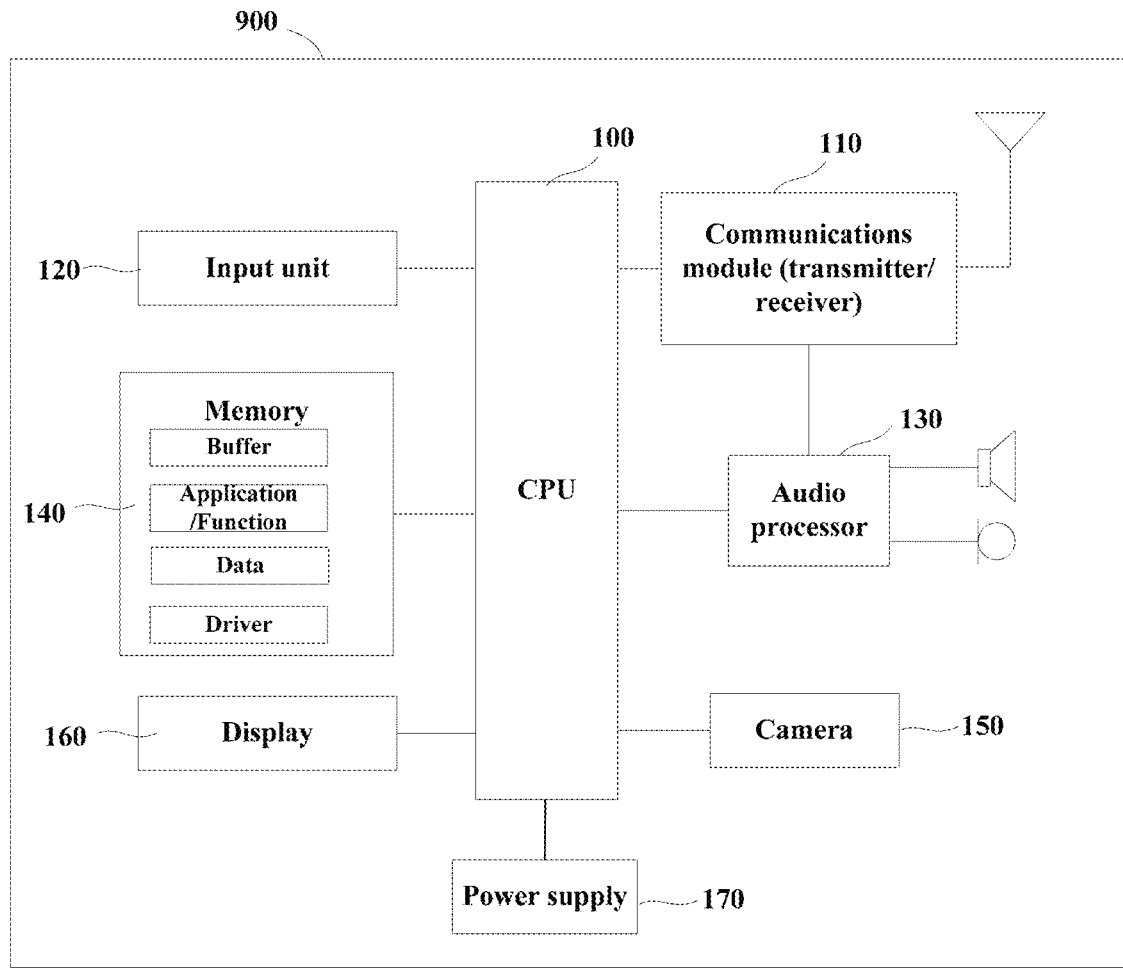
FIG. 9 is a schematic diagram of the UE of Embodiment 4 of this disclosure.

FIG. 9 is a schematic diagram of the UE of the embodiment of this disclosure. As shown in FIG. 9, the UE 900 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In one implementation, the functions of the apparatus 800 for paging a UE may be integrated into the central processing unit 100. The central processing unit 100 may be configured to carry out the method for paging a UE described in Embodiment 1.

For example, the central processing unit 100 may be configured to perform the following control: calculating a first-grade paging group index of the UE based on an inherent identity of the UE, or based on an inherent identity of the UE and a network configuration parameter; calculating a second-grade paging group index of the UE based on a network identity allocated by a mobility management entity for the UE; receiving indication information for indicating paging group indices transmitted by a base station, the paging group indices including a first-grade paging group index and a second-grade paging group index; determining whether the first-grade paging group index contained in the indication information is consistent with the calculated first-grade paging group index, and whether the second-grade paging group index contained in the indication information is consistent with the calculated second-grade paging group index; and decoding a downlink data channel transmitted by the base station to determine whether the UE is paged, when the first-grade paging group index contained in the indication information is consistent with the calculated first-grade paging group index and the second-grade paging group index contained in the indication information is consistent with the calculated second-grade paging group index.

In another implementation, the apparatus 800 for paging a UE and the central processing unit 100 may be configured separately. For example, the apparatus 800 for paging a UE may be configured as a chip connected to the central processing unit 100, with its functions being realized under control of the central processing unit.

As shown in FIG. 9, the UE 900 may further include a communications module 110, an input unit 120, an audio processor 130, a memory 140, a camera 150, a display 160 and a power supply 170. Functions of the above components are similar to those in the relevant art, and shall not be described herein any further. It should be noted that the UE 900 does not necessarily include all the parts shown in FIG. 9, and furthermore, the UE 900 may include parts not shown in FIG. 9, and the relevant art may be referred to.

It can be seen from the above embodiment that a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell. And furthermore, as the group number parameters of the paging allocation are determined by the parameter nB known to the UE, air-interface signaling needed by separately configuring the parameters may be reduced.

Embodiment 5

The embodiment of this disclosure provides an apparatus for paging a UE, configured in a base station. This embodiment corresponds to Embodiment 2, with contents identical those in Embodiments 1 and 2 being not going to be described herein any further.

Figure 10:
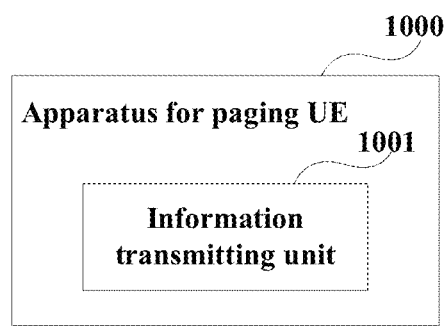
FIG. 10 is a schematic diagram of the apparatus for paging a UE of Embodiment 5 of this disclosure.

FIG. 10 is a schematic diagram of the apparatus for paging a UE of the embodiment of this disclosure. As shown in FIG. 8, the apparatus 1000 for paging a UE includes:

an information transmitting 1001 unit configured to transmit indication information for indicating paging group indices, the paging group indices including a first-grade paging group index and a second-grade paging group index;

the first-grade paging group index is obtained based on inherent identity of the UE, or based on the inherent identity of the UE and a network configuration parameter, and the second-grade paging group index is obtained based on network identity allocated by a mobility management entity for the UE.

In this embodiment, the inherent identity of the UE may be an IMSI, the network identity of the UE may be an S-TMSI, and the network configuration parameter may be a number nB denoting paging occasions of a cell in a paging cycle.

In one implementation, the first-grade paging group index and the second-grade paging group index may be calculated by the base station, and then contained in, for example, DCI of a PDCCH.

Figure 11:
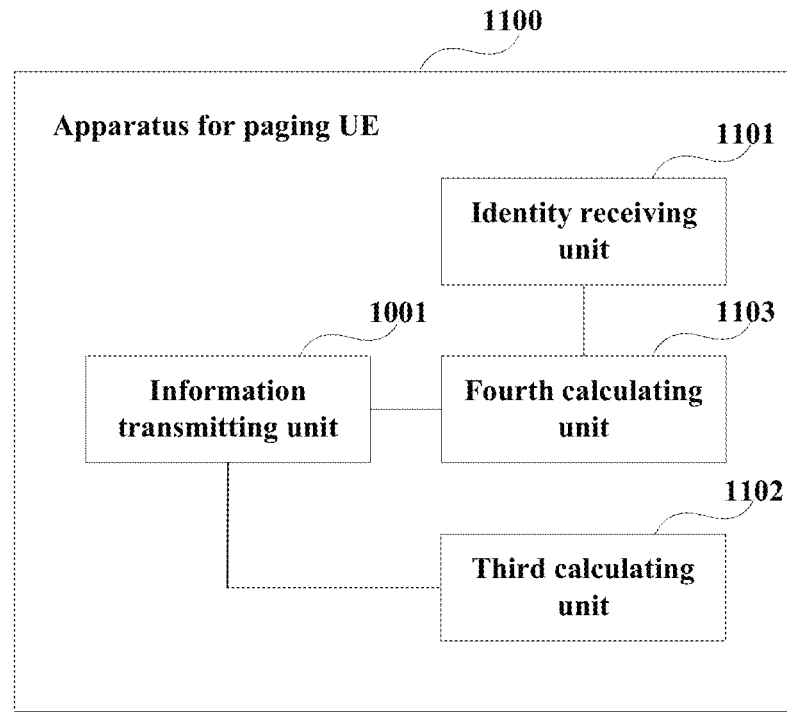
FIG. 11 is another schematic diagram of the apparatus for paging a UE of Embodiment 5 of this disclosure.

FIG. 11 is another schematic diagram of the apparatus for paging a UE of the embodiment of this disclosure. As shown in FIG. 11, the apparatus 1100 for paging a UE includes an information transmitting 1001, as described above.

As shown in FIG. 11, the apparatus 1100 for paging a UE may further include:

an identity receiving unit 1101 configured to receive the network identity transmitted by the MME;

a third calculating unit 1102 configured to calculate the first-grade paging group index of the UE based on the inherent identity of the UE, or based on the inherent identity of the UE and the network configuration parameter; and a fourth calculating unit 1103 configured to calculate the second-grade paging group index of the UE based on the network identity.

In another implementation, the first-grade paging group index and the second-grade paging group index may be calculated and then transmitted to the base station by the MME, and the base station contains the first-grade paging group index and the second-grade paging group index in, for example, the DCI of the PDCCH.

Figure 12:
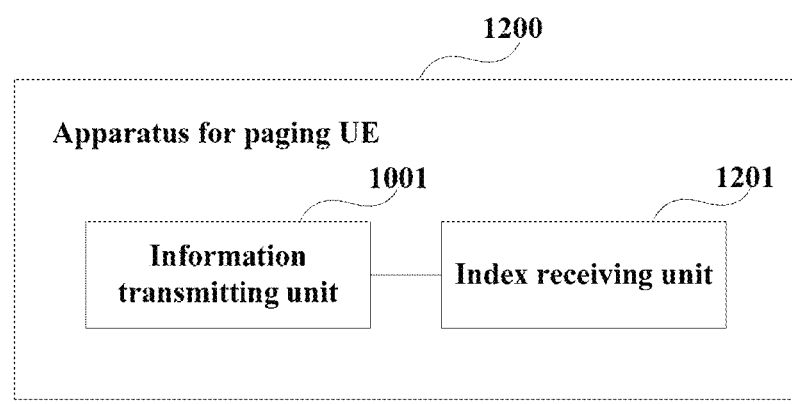
FIG. 12 is a further schematic diagram of the apparatus for paging a UE of Embodiment 5 of this disclosure.

FIG. 12 is a further schematic diagram of the apparatus for paging a UE of the embodiment of this disclosure. As shown in FIG. 12, the apparatus 1200 for paging a UE includes an information transmitting 1001, as described above.

As shown in FIG. 12, the apparatus 1200 for paging a UE may further include:

an index receiving unit 1201 configured to receive the first-grade paging group index and the second-grade paging group index transmitted by the MME.

In this embodiment, the information transmitting unit 1001 may further be configured to transmit cycle information, the cycle information indicating that no monitoring is needed within multiple paging cycles after the UE receives a paging message.

The embodiment of this disclosure further provides a base station, configured with the above apparatus 1000 for paging a UE, apparatus 1100 for paging a UE, or apparatus 1200 for paging a UE.

Figure 13:
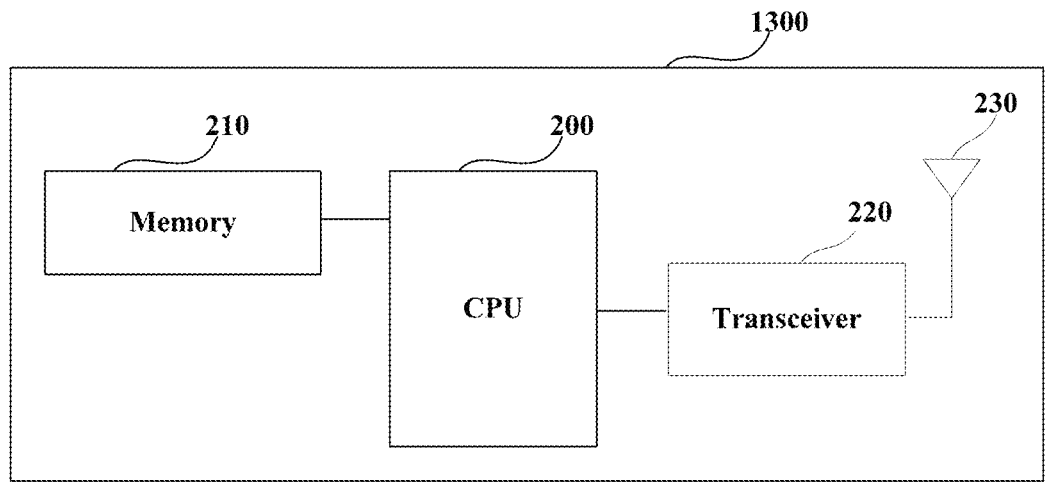
FIG. 13 is a schematic diagram of the base station of Embodiment 5 of this disclosure.

FIG. 13 is a schematic diagram of the base station of the embodiment of this disclosure. As shown in FIG. 13, the base station 1300 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The base station 1300 may carry out the method for paging a UE described in Embodiment 2. And the central processing unit 200 may be configured to carry out the functions of the apparatus 1000 for paging a UE, the apparatus 1100 for paging a UE, or the apparatus 1200 for paging a UE.

For example, the central processing unit 200 may be configured to perform the following control: transmitting indication information for indicating paging group indices, the paging group indices including a first-grade paging group index and a second-grade paging group index; the first-grade paging group index is obtained based on inherent identity of UE, or based on the inherent identity of the UE and a network configuration parameter, and the second-grade paging group index is obtained based on network identity allocated by a mobility management entity for the UE.

Furthermore, as shown in FIG. 13, the base station 1300 may include a transceiver 220, and an antenna 230, etc. Functions of the above components are similar to those in the relevant art, and shall not be described herein any further. It should be noted that the base station 1300 does not necessarily include all the parts shown in FIG. 13, and furthermore, the base station 1300 may include parts not shown in FIG. 13, and the relevant art may be referred to.

It can be seen from the above embodiment that a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell. And furthermore, as the group number parameters of the paging allocation are determined by the parameter nB known to the UE, air-interface signaling needed by separately configuring the parameters may be reduced.

Embodiment 6

The embodiment of this disclosure provides an apparatus for paging a UE, configured in an MME. This embodiment corresponds to Embodiment 3, with contents identical those in Embodiments 1-3 being not going to be described herein any further.

Figure 14:
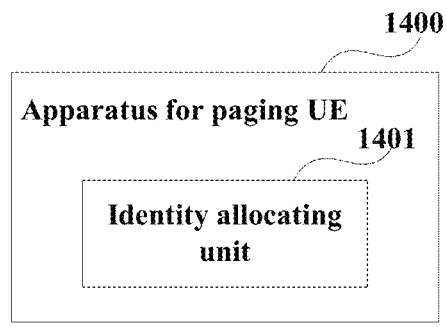
FIG. 14 is a schematic diagram of the apparatus for paging a UE of Embodiment 6 of this disclosure.

FIG. 14 is a schematic diagram of the apparatus for paging a UE of the embodiment of this disclosure. As shown in FIG. 14, the apparatus 1400 for paging a UE includes:

an identity allocating unit 1401 configured to allocate a network identity for the UE attached to the mobility management entity;

the network identity makes multiple UEs belonging to the same first-grade paging group uniformly distributed in different second-grade paging groups, the first-grade paging group being formed based on inherent identities of the UE, or based on the inherent identities of the UE and network configuration parameters.

In this embodiment, the inherent identity of the UE may be an IMSI, the network identity of the UE may be an S-TMSI, and the network configuration parameter may be a number nB denoting paging occasions of a cell in a paging cycle.

In one implementation, the first-grade paging group index and the second-grade paging group index may be calculated by the base station, and may be contained by the base station in, for example, the DCI of the PDCCH.

Figure 15:
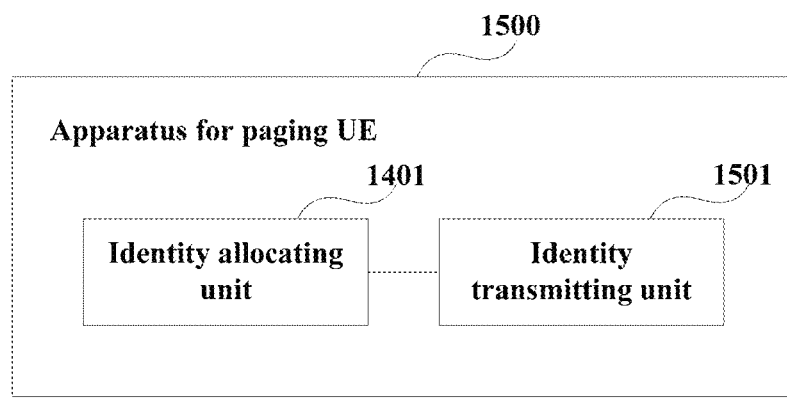
FIG. 15 is another schematic diagram of the apparatus for paging a UE of Embodiment 6 of this disclosure.

FIG. 15 is another schematic diagram of the apparatus for paging a UE of the embodiment of this disclosure. As shown in FIG. 15, the apparatus 1500 for paging a UE includes an identity allocating unit 1401, as described above.

As shown in FIG. 15, the apparatus 1500 for paging a UE may further include:

an identity transmitting unit 1501 configured to transmit the network identity allocated for the UE to a base station.

In another implementation, the first-grade paging group index and the second-grade paging group index may be calculated by the MME and then transmitted to the base station, and the base station may contain the first-grade paging group index and the second-grade paging group index in, for example, the DCI of the PDCCH.

Figure 16:
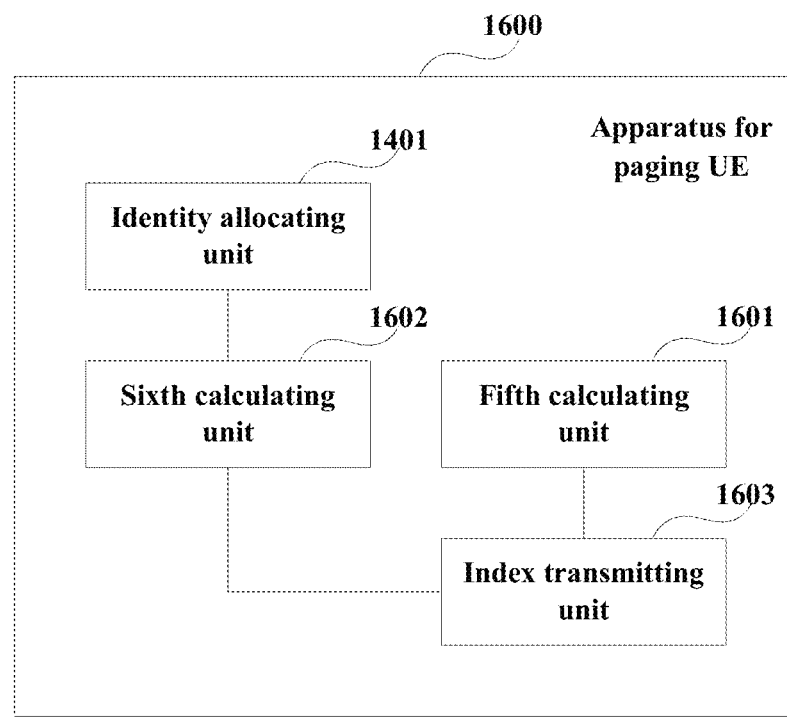
FIG. 16 is a further schematic diagram of the apparatus for paging a UE of Embodiment 6 of this disclosure.

FIG. 15 is a further schematic diagram of the apparatus for paging a UE of the embodiment of this disclosure. As shown in FIG. 16, the apparatus 1600 for paging a UE includes an identity allocating unit 1401, as described above.

As shown in FIG. 16, the apparatus 1600 for paging a UE may further include:

a fifth calculating unit 1601 configured to calculate a first-grade paging group index of the UE based on the inherent identity of the UE, or based on the inherent identity of the UE and the network configuration parameter;

a sixth calculating unit 1602 configured to calculate a second-grade paging group index of the UE based on the network identity; and an index transmitting unit 1603 configured to transmit the first-grade paging group index and the second-grade paging group index to the base station.

Figure 17:
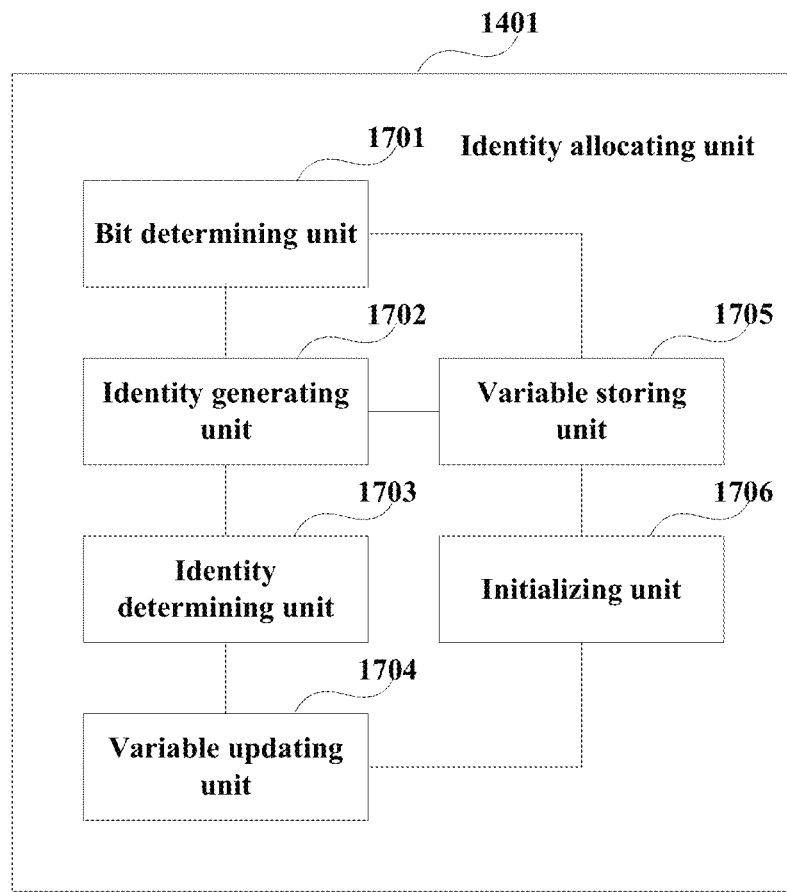
FIG. 17 is a schematic diagram of the identity allocating unit of Embodiment 6 of this disclosure.

FIG. 17 is a schematic diagram of the identity allocating unit of the embodiment of this disclosure. As shown in FIG. 17, the identity allocating unit 1401 may include:

a bit determining unit 1701 configured to determine L bits in the IMSI of the UE; where, L is a predefined value, a numeral value constituted by the L bits is temp, the temp corresponding to a variable S-TMSI_Group[temp];

an identity generating unit 1702 configured to generate an S-TMSI satisfying the following condition:

S-TMSI mod $2^M$=S-TMSI_Group[temp]; where, M is a predefined number of bits used in S-TMSI grouping, and mod denotes a modulo operation;

an identity determining unit 1703 configured to allocate the S-TMSI for the UE; and a variable updating unit 1704 configured to update S-TMSI_Group[temp].

As shown in FIG. 17, the identity allocating unit 1401 may further include:

a variable storing unit 1705 configured to store $2^L$ variables S-TMSI_GroupID[i]; where, 1=0, 1, 2, 3, . . . , $2^L-1$; and an initializing unit 1706 configured to initialize S-TMSI_GroupID[i], and reset S-TMSI_Group[temp] when a value of S-TMSI_Group[temp] after being updated by the variable updating unit 1704 is equal to $2^M$, such as resetting to be 0.

In one implementation, the bit determining unit 1701 is configured to: select at least 10 bits in the international mobile subscriber identity when the first-grade paging group is formed based on inherent identities of the multiple UEs and the network configuration parameters;

where, UE_ID=IMSI mod 1024;

Paging_GroupID=UE_ID div $nB$, or,
Paging_GroupID=floor(UE_ID/$nB$);

Paging_GroupID is the first-grade paging group index, IMSI is the international mobile subscriber identity, nB is the network configuration parameter, mod denotes a modulo operation, div denotes a division operation, and floor denotes a rounded down operation.

In another implementation, the bit determining unit 1701 is configured to: select the lowest 10 bits and bits from a ($\log_2 P$+1)-th bit to a ($\log_2(G*P)$)-th bit in an ascending order in the international mobile subscriber identity when the first-grade paging group is formed based on the inherent identities of the multiple UEs;

where, Paging_GroupID=(IMSI mod G*P)/P;

and G and P are predefined values, P≥1024, Paging_GroupID is the first-grade paging group index, IMSI is the international mobile subscriber identity, and mod denotes a modulo operation.

The embodiment of this disclosure further provides an MME, configured with the above apparatus 1400 for paging a UE, apparatus 1500 for paging a UE, or apparatus 1600 for paging a UE.

Figure 18:
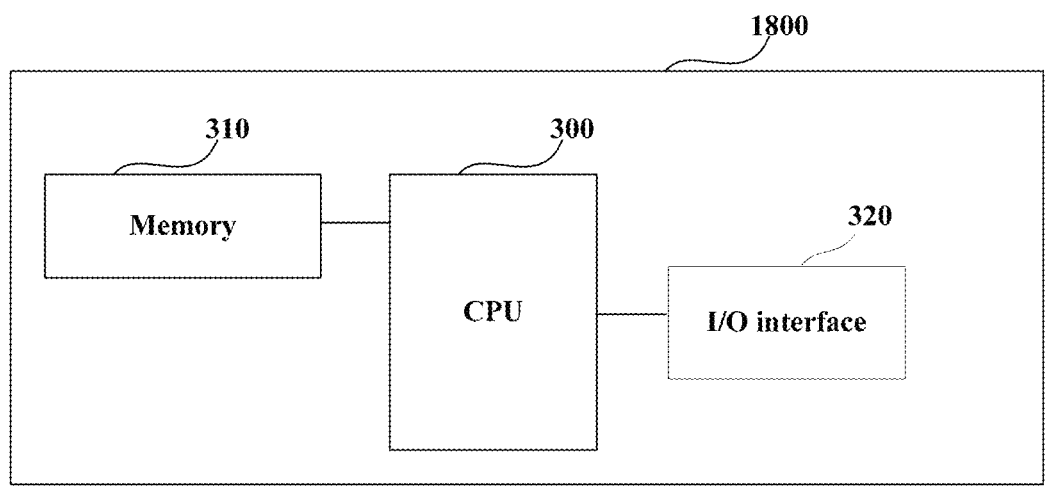
FIG. 18 is a schematic diagram of the MME of Embodiment 6 of this disclosure.

FIG. 18 is a schematic diagram of the MME of the embodiment of this disclosure. As shown in FIG. 18, the MME 1800 may include a central processing unit (CPU) 300 and a memory 310, the memory 310 being coupled to the central processing unit 300. The memory 310 may store various data, and furthermore, it may store a program for information processing, and execute the program under control of the central processing unit 300.

The MME 1800 may carry out the method for paging a UE described in Embodiment 3. And the central processing unit 300 may be configured to carry out the functions of the apparatus 1400 for paging a UE, the apparatus 1500 for paging a UE, or the apparatus 1600 for paging a UE.

For example, the central processing unit 300 may be configured to perform the following control: allocating a network identity for a UE attached to the MME; the network identity makes multiple UEs belonging to the same first-grade paging group uniformly distributed in different second-grade paging groups, the first-grade paging group being formed based on inherent identities of the UE, or based on the inherent identities of the UE and network configuration parameters.

Furthermore, as shown in FIG. 18, the MME 1800 may include an input/output (I/O) interface 320, etc. Functions of the above components are similar to those in the relevant art, and shall not be described herein any further. It should be noted that the MME 1800 does not necessarily include all the parts shown in FIG. 18, and furthermore, the MME 1800 may include parts not shown in FIG. 18, and the relevant art may be referred to.

It can be seen from the above embodiment that the MME may control the lowest M bits of the network identity in allocating network identity, and a first-grade paging group is divided based on an inherent identity of the UE, or based on an inherent identity of the UE and a network configuration parameter, and a second-grade paging group is divided based on a network identity allocated by a mobility management entity for the UE. Hence, different paging groups may have identical or approximate numbers of UEs, which may reduce a probability of "false paging" of the overall cell. And furthermore, as the group number parameters of the paging allocation are determined by the parameter nB known to the UE, air-interface signaling needed by separately configuring the parameters may be reduced.

Embodiment 7

The embodiment of this disclosure provides a communications system, with contents identical embodiments 1-6 being not going to be described herein any further.

Figure 19:
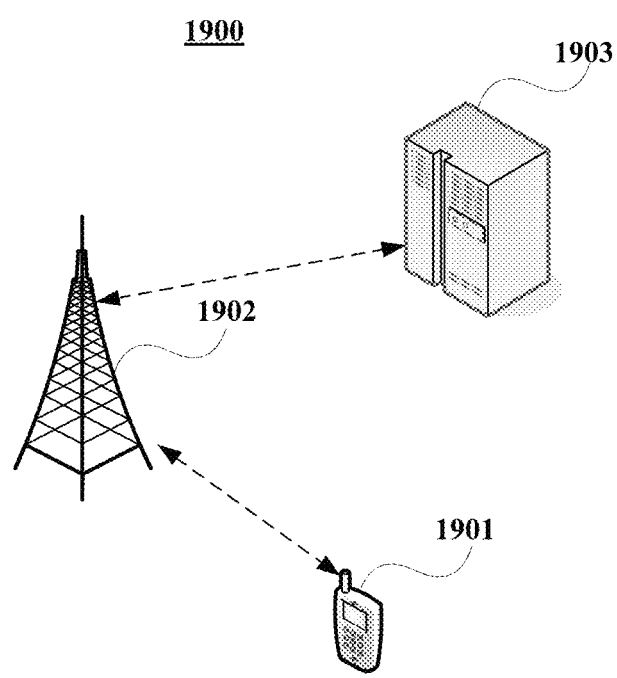
FIG. 19 is a schematic diagram of the communications system of Embodiment 7 of this disclosure.

FIG. 19 is a schematic diagram of the communications system of the embodiment of this disclosure. As shown in FIG. 19, the communications system 1900 includes a UE 1901, a base station 1902 and an MME 1903.

The UE 1901 may be as described in Embodiment 4, the base station 1902 may be as described in Embodiment 5, and the MME 1903 may be as described in Embodiment 6.

An embodiment of the present disclosure provides a computer readable program, which, when executed in a UE, will cause a computer unit to carry out the method for paging a UE described in Embodiment 1 in the UE.

An embodiment of the present disclosure provides a computer storage medium, including a computer readable program, which will cause a computer unit to carry out the method for paging a UE described in Embodiment 1 in a UE.

An embodiment of the present disclosure provides a computer readable program, which, when executed in a base station, will cause a computer unit to carry out the method for paging a UE described in Embodiment 2 in the base station.

An embodiment of the present disclosure provides a computer storage medium, including a computer readable program, which will cause a computer unit to carry out the method for paging a UE described in Embodiment 2 in a base station.

An embodiment of the present disclosure provides a computer readable program, which, when executed in an MME, will cause a computer unit to carry out the method for paging a UE described in Embodiment 3 in the MME.

An embodiment of the present disclosure provides a computer storage medium, including a computer readable program, which will cause a computer unit to carry out the method for paging a UE described in Embodiment 3 in an MME.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or blocks or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A user equipment (UE) comprising:
a memory configured to store a plurality of instructions; and
a processor coupled to the memory and configured to execute the plurality of instructions to:
calculate a second paging group index of a second-grade paging group based on a first paging group index of a first-grade paging group and a parameter obtained by the UE via system information, the first paging group index Paging_GroupID is defined by the following formula:

Paging_GroupID=floor(UE_ID/$nB$);

where, Paging_GroupID is the first paging group index, UE_ID is based on an identity of the UE, nB is a parameter associate with paging occasions of a cell in paging cycle and floor denotes a rounded down operation,
wherein the second paging group index is used to determine which narrowband or which carrier the UE performs a paging message reception.

2. The UE according to claim 1, wherein, the identity of the UE is an international mobile subscriber identity.

3. The UE according to claim 1, wherein the processor is further configured to receive cycle information transmitted by the base station, the cycle information indicating that no monitoring is needed within multiple paging cycles after a paging message is received.

4. A base station comprising:
a memory configured to store a plurality of instructions;
processor coupled to the memory and configured to execute the plurality of instructions to:
calculate a second paging group index of a second-grade paging group on a first paging group index of a first-grade paging group and a parameter obtained by the UE via system information, the first paging group index Paging_GroupID is defined by the following formula:

Paging_GroupID=floor(UE_ID/$nB$);

where, Paging_GroupID is the first paging group index, UE_ID is based on an identity of a user equipment (UE), nB is a parameter associate with paging occasions of a cell in a paging cycle and floor denotes a rounded down operation,
wherein the second paging group index is used to determine which narrowband or which carrier the UE performs a paging message reception.

5. The base station according to claim 4, wherein the processor is further configured to transmit cycle information, the cycle information indicating that no monitoring is needed within multiple paging cycles after the UE receives a paging message.

* * * * *